Aug. 27, 1968     J. D. WILSON     3,398,840

NESTABLE-STACKABLE RECEPTACLE

Filed Oct. 24, 1966     5 Sheets-Sheet 1

INVENTOR.
James D. Wilson

By Keith D. Beecher
                 ATTORNEY

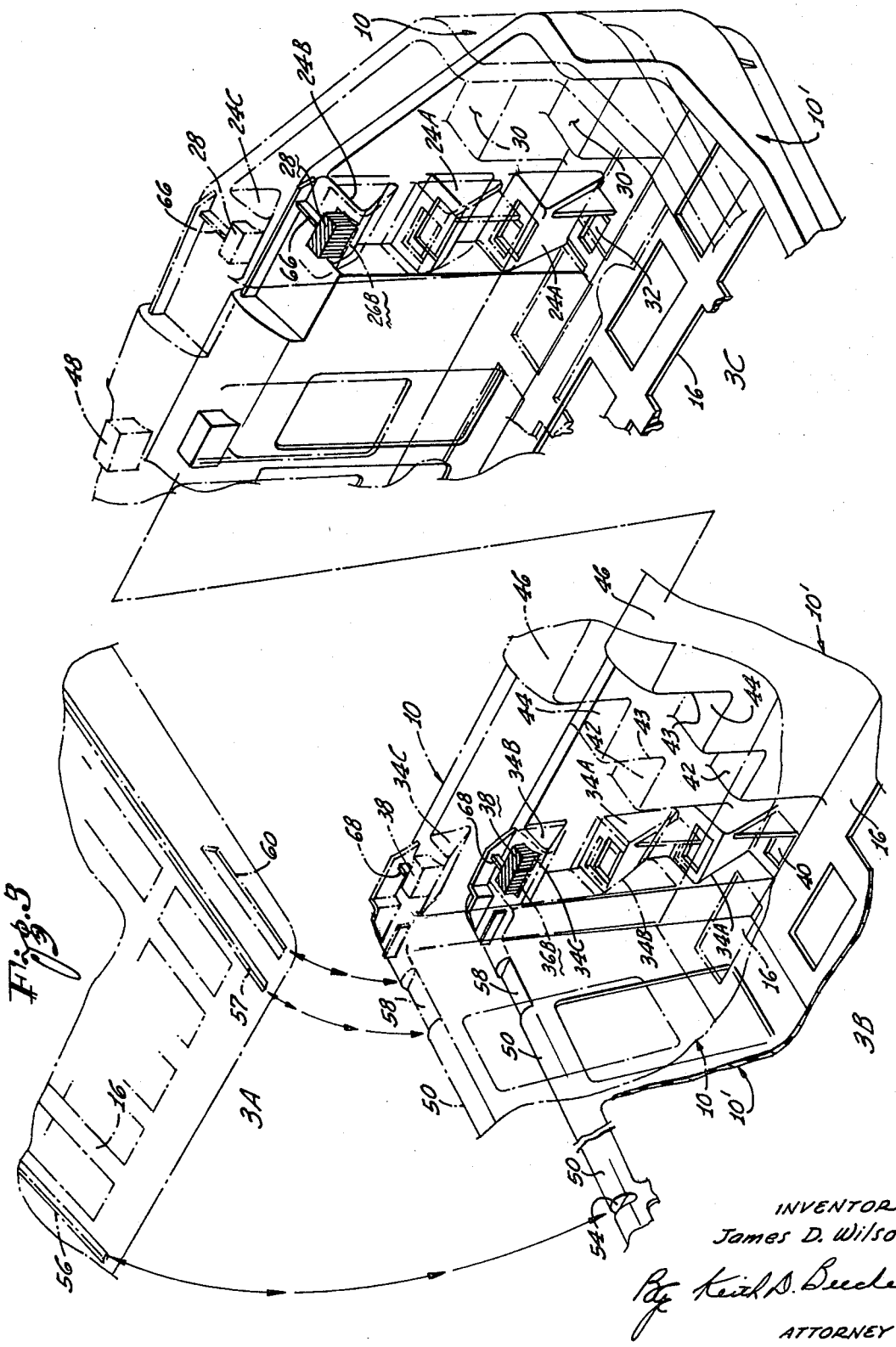

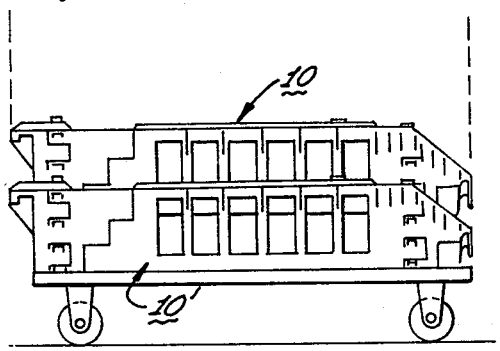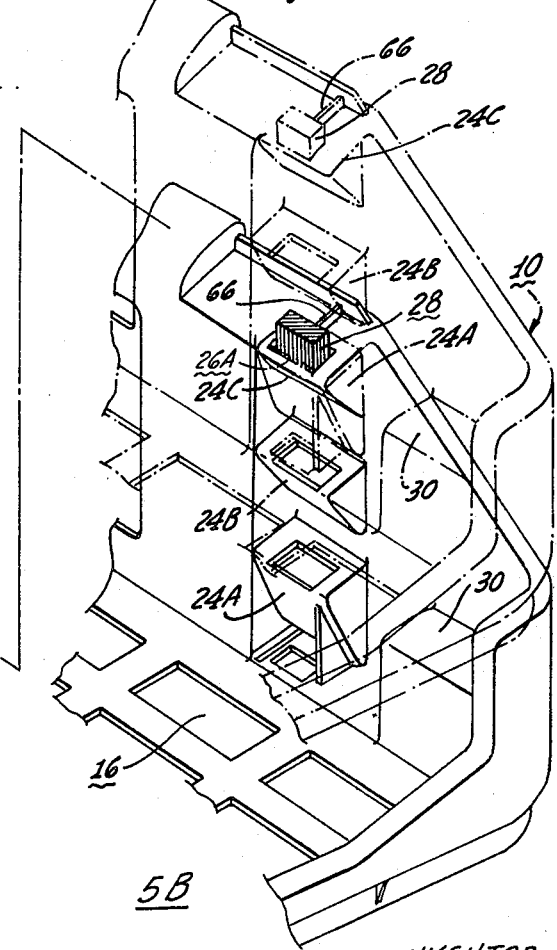

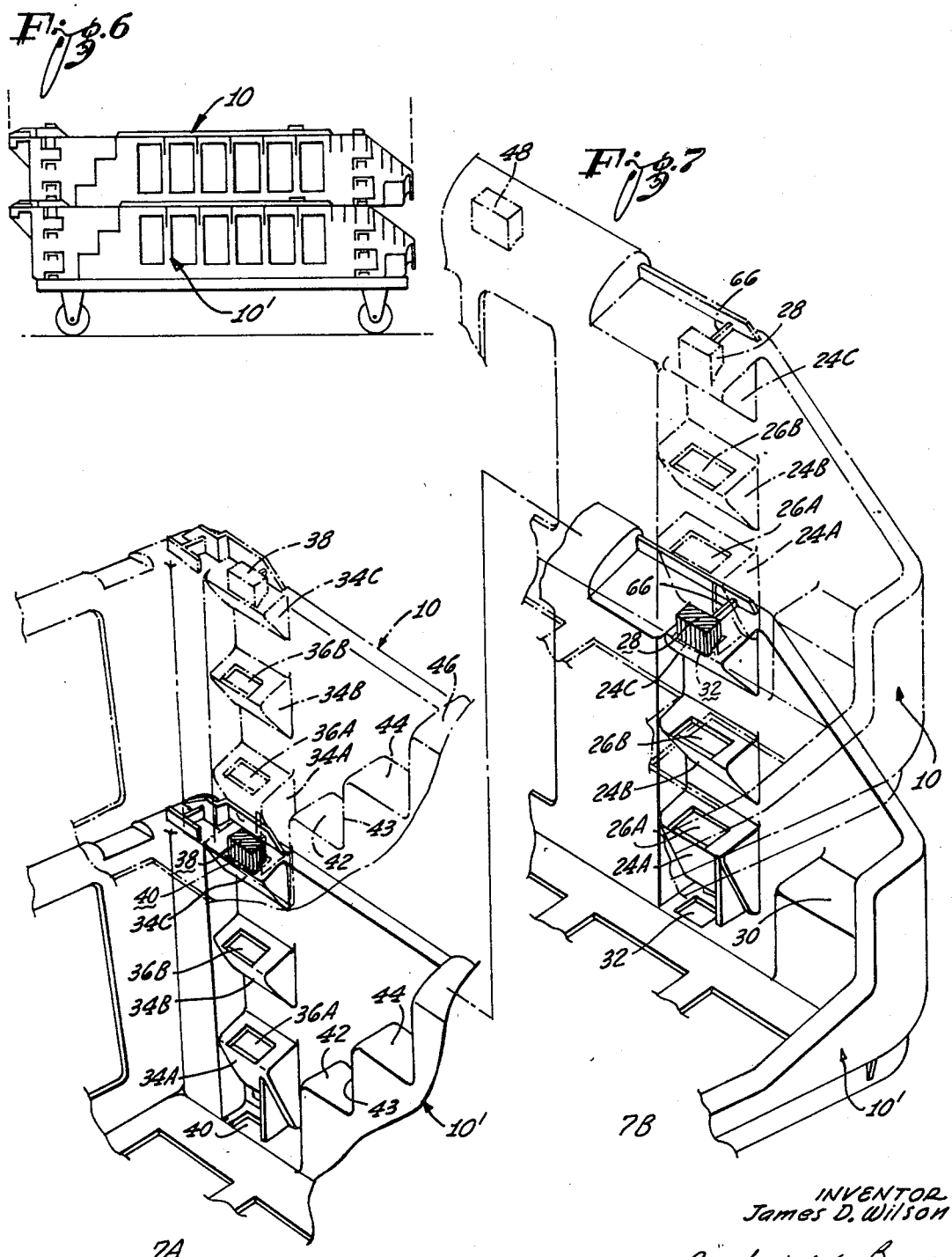

Aug. 27, 1968  J. D. WILSON  3,398,840
NESTABLE-STACKABLE RECEPTACLE
Filed Oct. 24, 1966  5 Sheets-Sheet 3
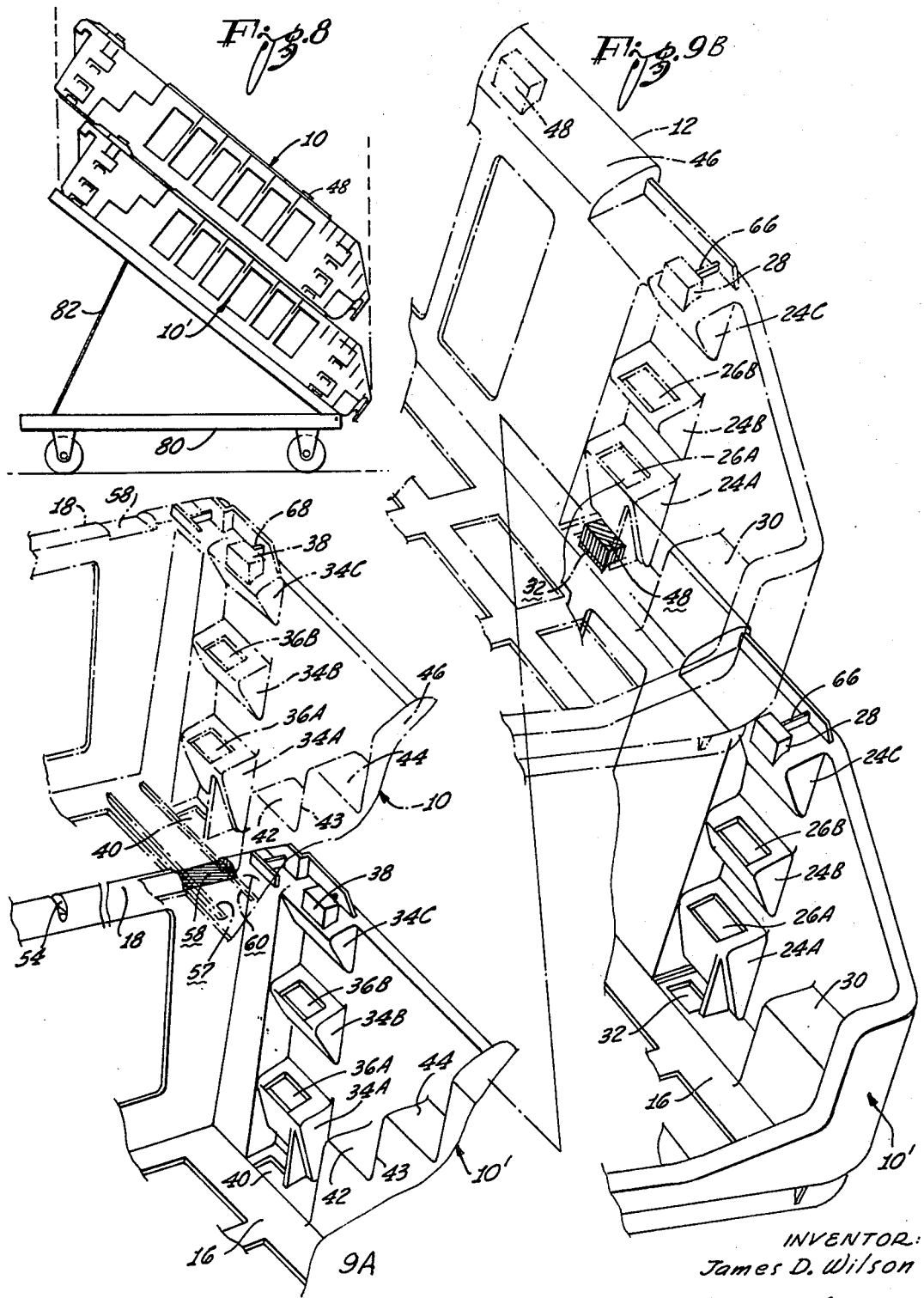
INVENTOR:
James D. Wilson
By Keith D. Beecher
ATTORNEY

United States Patent Office 3,398,840
Patented Aug. 27, 1968

3,398,840
NESTABLE-STACKABLE RECEPTACLE
James D. Wilson, Long Beach, Calif., assignor to Banner Metals, Inc., Compton, Calif., a corporation of Ohio
Filed Oct. 24, 1966, Ser. No. 588,804
9 Claims. (Cl. 211—126)

ABSTRACT OF THE DISCLOSURE

An improved plastic or sheet metal receptacle is provided which is capable of storing and displaying bread, for example, or other bakery products, or the like. The receptacle of the invention is constructed so that it may be stacked with other similar receptacles to display the merchandise, and so that it may be nested down into the other receptacles when empty, in order to conserve space.

---

This invention relates to receptacles which may be formed of plastic or sheet metal materials and which may be utilized for retaining and displaying bread and other bakery products, merchandise and the like. More particularly this invention relates to a tray-like receptacle provided with structure which facilitates the nesting and stacking of a multiplicity of receptacles in various positions so as to thereby provide versatility in the retention and display of bakery products, merchandise and the like contained within the receptacles.

In the storing, transporting, merchandising and display of bread and other bakery products, and the like, it is often mandatory that maximum space be conserved in carrying out such storing, transporting and display. It is further desirable that the receptacles used for storing, transporting and displaying bakery products and the like have sufficient versatility so that various types of bakery products, for example, may be so stored, transported and displayed. Often a display of bakery products will include a multiplicity of various types, shapes, sizes and quantities of the bakery products so displayed. It is recognized that the most efficient use of space available for merchandising bakery products, for example, may be realized when the receptacles in which the bakery products are contained are stacked in a vertical relationship one with the other. However, in providing for such a vertical stacking of receptacles in which a maximum conservation of space available for displaying the bakery products is realized, it is desirable that the vertically stacked receptacles have the capability of affording a versatility for spatial displacement between adjacently disposed vertically stacked receptacles. Such versatility in the vertical displacement of adjacent disposed vertically stacked receptacles is, of course, mandatory if adequate conservation of space is to be realized in the storing, transporting and display of bakery products having varying weights, sizes and dimensional configurations.

It is recognized that bakery products, and the like, retained and displayed within receptacles will be taken from the receptacles by bakery products salesmen or buyers of the bakery products and that the depleted bakery products must be replaced in the receptacle from which they have been taken. Also, it is recognized that care must be taken not to allow the bakery products displayed in the front portion of the receptacle to be depleted for long periods of time and not replaced since the bakery products in the recessed portions of the receptacle may not be seen by the shopper or because of its physical location within the receptacle may present a difficult situation for the shopper in procuring the bakery products from the receptacle.

Accordingly, it is an object of this invention to provide improved receptacles which may be nested and stacked in various arrangements which provide for a maximum conservation of space available for the receptacles.

Another object of this invention is to provide an improved receptacle which may be nested and stacked with a multiplicity of like receptacles so that provision is made for varying dimensional clearances between adjacently disposed vertically stacked receptacles.

Another object of this invention is to provide an improved receptacle for bakery products, and the like, which may be stacked with a multiplicity of like receptacles in a manner so that the bakery products retained in each receptacle so stacked is continuously displayed at the forward exposed portion of the receptacle, and the bakery products so displayed is continuously displayed as long as bakery products remain within the receptacle, such continuous display of bakery products being provided for without the aid of tools, machines or hands, but instead being brought about by normal gravitational force.

Another object of this invention is to provide receptacles which may be neatly and compactly stacked and nested without the need for rotating or excessively manipulating the receptacles by means of tools, machines or hand.

Another object of this invention is to provide a receptacle which has no movable parts, but which may be quickly, effectively and securely stacked and nested with a multiplicity of like receptacles.

Another object of this invention is to provide a receptacle which may be stacked and nested with a multiplicity of like receptacles by means of only slight hand motion.

Another object of this invention is to provide a receptacle which is lightweight, rugged and which is easily transported, stored and otherwise manually handled.

The novel features that are considered characteristic of this invention are set forth with particularity in the appended claims. The invention, as well as additional objects and advantages thereof, will best be understood from the following description when read in connection with the accompanying drawings, in which:

Figure 1:
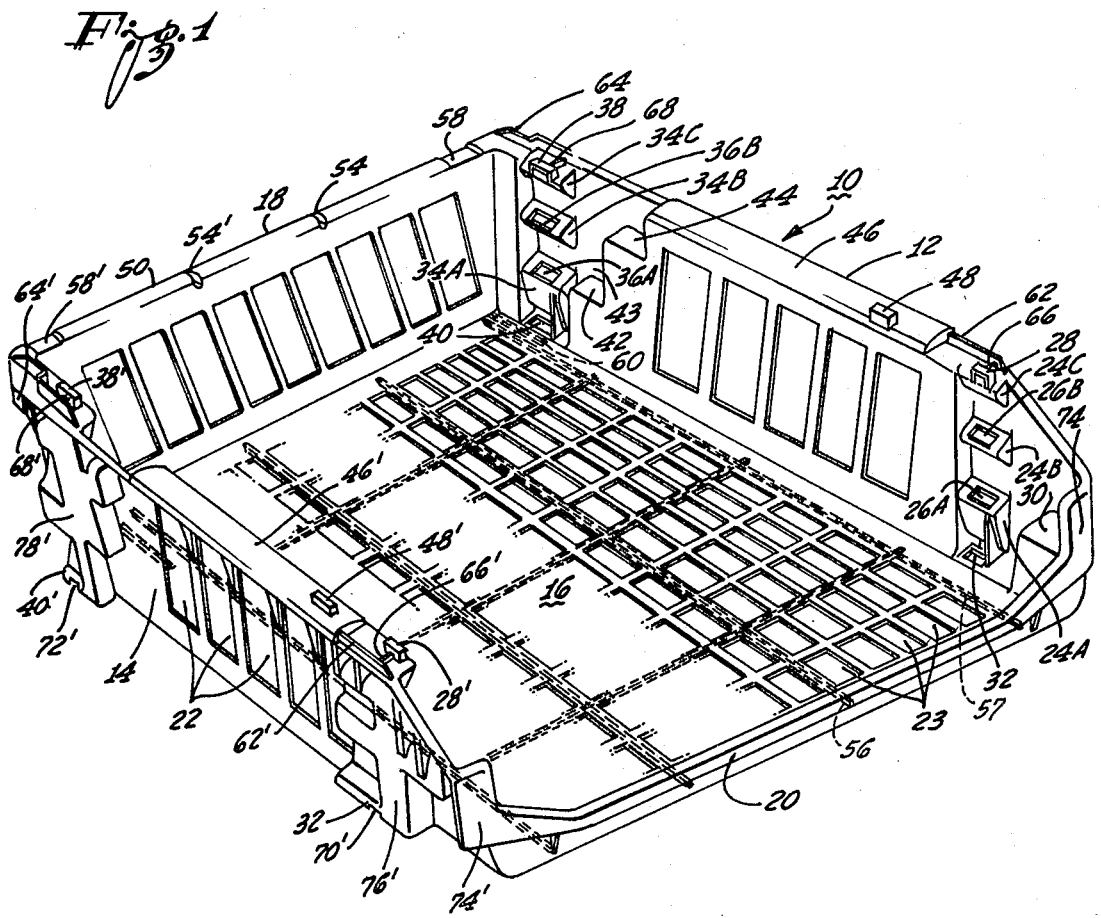
FIGURE 1 is a perspective view of the receptacle of this invention.
Figure 2:
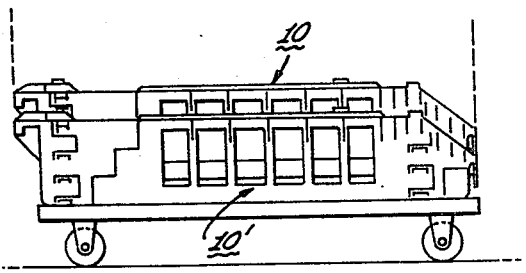
FIGURE 2 is a side view of two receptacles similar to the receptacle of this invention stacked in a vertical relationship with minimium vertical displacement between the receptacles.

FIGURES 3A, 3B and 3C show receptacles similar to the receptacle of this invention vertically nested with minimum spatial displacement between adjacently disposed vertically nested receptacles; FIGURE 3A shows the bottom portion of a receptacle prior to its being vertically stacked; FIGURE 3B shows broken-away right rear corner portions as seen in FIGURE 1, of two vertically nested receptacles; FIGURE 3C shows broken-away right forward corner portions as seen in FIGURE 1, of two vertically nested receptacles;

FIGURE 4 is a side view of two receptacles similar to the receptacle of this invention stacked in a vertical relationship with medium vertical displacement between the receptacles;

FIGURES 5A and 5B show receptacles similar to the receptacles of this invention vertically stacked with medium spatial displacement between adjacently disposed vertically stacked receptacles; FIGURE 5A shows broken-away right rear corner portions as seen in FIGURE 1, of two vertically stacked receptacles stacked as shown in FIGURE 4; FIGURE 5B shows broken-away right forward corner portions as seen in FIGURE 1, of two vertically stacked receptacles stacked as shown in FIGURE 4;

FIGURE 6 is a side view of two receptacles similar to the receptacle of this invention stacked in a vertical relationship with greater spatial displacement between adjacently disposed vertically stacked receptacles than is shown in FIGURE 4;

FIGURES 7A and 7B show receptacles similar to the receptacle of this invention vertically stacked as shown in FIGURE 6; FIGURE 7A shows broken-away right rear corner portions, as seen in FIGURE 1, of two vertically stacked receptacles stacked as shown in FIGURE 6; FIGURE 7B shows broken-away right forward corner portions, as seen in FIGURE 1, of two vertically stacked receptacles, stacked as shown in FIGURE 6;

FIGURE 8 is a side view of two receptacles similar to the receptacle of this invention vertically stacked and canted at an angle to the horizontal plane, the receptacles being stacked so as to have maximum spatial displacement between adjacently disposed stacked receptacles; and FIGURES 9A and 9B show receptacles similar to the receptacle of this invention vertically stacked and canted as shown in FIGURE 8; FIGURE 9A shows broken-away right rear corner portions, as seen in FIGURE 1, of two vertically stacked canted receptacles stacked as shown in FIGURE 8; FIGURE 9B shows broken-away right forward corner portions, as seen in FIGURE 1, of two vertically stacked canted receptacles stacked as shown in FIGURE 8.

Referring to FIGURE 1 of the drawings, the receptacle of this invention is generally designated by the numeral 10. The receptacle 10 is provided with side walls 12 and 14 which vertically extend from the bottom 16 of the receptacle. An end wall 18 is joined to the bottom 16 and extends vertically therefrom. The end wall 18 connects with the side walls 12 and 14 for forming a three-sided enclosure which is connected with the bottom 16 thus forming the fundamental configuration for the receptacle 10. The receptacle 10 has an open end 20 through which produce, for example, retained within the receptacle 10 may be inserted or removed.

The side walls 12 and 14 and the end wall 18 of the receptacle 10 are provided with perforations 22 therein so as to reduce the weight of the receptacle 10. Similarly, the bottom 16 may be provided with perforations 23. The forward portion of the side wall 12, as viewed in FIGURE 1, is provided with three obliquely projecting portions 24a, 24b, and 24c. The forward portion of the side wall 14 is similarly provided with three obliquely projecting portions, not shown in the drawings. Projecting portions 24a and 24b are provided with perforations 26a and 26b respectively. Projecting portion 24c is provided with a projected protrusion 28 which extends from the upper surface of the portion 24c. The protrusion 28 has a configuration which permits it to be extended into and through perforations 26a and 26b provided on receptacles similar to the receptacle 10 of this invention.

The side walls 12 and 14 slope gradually from the projecting portions 24c in a forward and downward direction so as to thereby provide an open end 20 for the receptacle 10. The forward portion of the side wall 12 is provided with a platform section or shoulder 30. The forward portion of the side wall 14 is similarly provided with a platform section or shoulder, not shown in the drawings. The shoulder 30 has its upper surface in the same horizontal plane as the upper surface of the projecting portion 24a for purposes which will be more fully described hereinafter.

A perforation 32 is provided in the bottom 16 directly beneath the perforation 26a. A similar perforation, not shown in the drawings, is provided in the bottom 16 at the direct opposite side of the receptacle from the perforation 32. The perforation 32, and its similar oppositely disposed perforation, are provided in the receptacle 10 for receiving protrusions 28 and 28' or similar protrusions on a receptacle such as the receptacle of this invention which may be stacked in a manner to be more fully described hereinafter.

The rear portion of the side wall 12 as viewed in FIGURE 1 is provided with three obliquely projecting portions 34a, 34b and 34c. The rear portion of the side wall 14 is similarly provided with three obliquely projecting portions, not shown in the drawings. The projecting portions 34a, 34b and 34c are similar in size and configuration to the projecting portions 24a, 24b and 24c provided on the forward side wall 12 of the receptacle 10. The projecting portions 34a, 34b are provided with perforations 36a and 36b respectively. The projecting portions 34c is provided with a projecting protrusion 38 which extends from the upper surface of the portion 34c. The protrusion 38 is similar to the protrusion 28 found on the forward portion of receptacle 10. Protrusion 38 has a configuration which permits it to be extended into and through perforations similar to 36a and 36b provided on receptacles similar to the receptacle 10 of this invention. A similar protrusion 38' is provided at the direct opposite side of the receptacle from the protrusion 38.

A perforation 40 is provided in the bottom 16 directly beneath the perforation 36a. A similar perforation, not shown in the drawings, is provided in the bottom 16 at the direct opposite side of the receptacle from the perforation 40. The perforation 40 and its similar oppositely disposed perforation are provided in the receptacle 10 for receiving protrusions 38 and 38' or similar protrusions on a receptacle such as the receptacle of this invention which may be stacked in a manner to be more fully described hereinafter.

The rear portion of the side wall 12, as viewed in FIGURE 1, is provided with stepped platform or shoulder portions 42 and 44. Shoulder 42 is in the same horizontal plane as the upper surface of projecting portion 34a. Similarly, shoulder 44 is in the same horizontal plane as the upper surface of projecting protrusion 34b. Likewise, the upper surface of projecting portion 24a is in the same horizontal plane as projecting portion 34a and shoulder 42 while the upper surface of projecting portion 24b is in the same horizontal plane as projecting portion 34b and shoulder 44 for reasons which will become more apparent from the description hereinafter.

The side walls 12 and 14 have flat upper surfaces 46 and 46', respectively. The upper surfaces 46 and 46' are provided with projecting protrusions 48 and 48' respectively. The protrusions 48 and 48' have a configuration which permits them to fit snugly within perforations such as perforation 32 provided on receptacles similar to the receptacle 10 of this invention so that the receptacles may be stacked in a manner to be more fully described hereinafter.

The end wall 18 of the receptacle 10 is provided on its upper surface 50 with notched portions 54 and 54'. Notched portions 54 and 54' receive ribbed members, such as ribbed member 56 shown in FIGURE 3A, provided on the under side of the bottom 16 of the receptacle 10. Similarly, the upper surface 50 of the end wall 18 is provided with notched portions 58 and 58'. The notched portions 58 and 58' have greater lateral dimension than do notches 54 and 54' in order to receive parallel ribbed members, such as ribbed members 57 and 60 shown in FIGURE 3A, provided on the under side of the bottom 16 of the receptacle 10.

Each of the protrusions 28, 28', 38 and 38' is connected to vertically extending ribbed portions 62, 62', 64 and 64' by vertically extending ridge members 66, 66', 68 and 68' respectively. The outer portions of the perforations 32, 32', 40 and 40' are provided with notched recesses 70, 70', 72 and 72', respectively, so that when the protrusions 28, 28', 38 and 38' extend through perforations 32, 32', 40, 40', respectively, the notches 70, 70', 72, 72' will firmly fit over the ribbed portions 66, 66', 68, 68' respectively, and securely hold the receptacles in a position where they are thereby securely locked one to the other.

Athough only the internal structure of side wall 12 and only the external structure of side wall 14 may be viewed in the drawings, it is understood that both side walls 12 and 14 are provided with oppositely disposed identical structure. Thus in this description of the receptacle 10 the structure provided on the side wall 12 is designated by a number and the oppositely disposed identical structure provided on the side wall 14 is designated by that number prime. For purposes of clarity and completeness of description such reference and number designation is made herein regardless of whether or not the structure so referenced is shown in the drawings.

Referring to FIGURE 1 it is seen that there is sufficient displacement between the projecting portions 24a, 24b, 24c and front wall 14 and between projecting portions 24a', 24b', 24c' and front wall 74' so that the entire width of protruding portions 76 and 76' on the exterior surface of side walls 12 and 14 respectively are adequately accommodated when one receptacle 10 is placed within another such receptacle. Similarly, referring to the rear portion of the receptacle 10 as seen in FIGURE 1, it is seen that there is sufficient displacement between the projecting portions 34a, 34b, 34c and the vertical wall 43 which connects shoulders 42 and 44, and between projecting portions 34a', 34b', 34c' and the vertical wall 43 which connects shoulders 42' and 44' so that the entire width of protruding portions 78 and 78' on the exterior surface of side walls 12 and 14 respectively are adequately accommodated when one receptacle 10 is placed within another such receptacle.

In order to obtain the close nesting arrangement shown in FIGURES 2, 3A, 3B and 3C, a receptacle 10 is first placed within a receptacle 10' so that protruding portions 76, 76', 78 and 78' of receptacle 10 rest firmly on shoulders 30, 30', 42 and 42' respectively of the receptacle 10'. The upper surfaces 46 and 46' of the receptacle 10 may then be grasped by hand and the receptacle 10 moved or slid in a rearward direction until the bottom surfaces of protruding portions 76, 76', 78, 78' are superimposed upon and supported by projecting portions 24a, 24a', 34a and 34a' respectively of the receptacle 10' into which the receptacle 10 is placed. In this position, the projecting portions 24a, 24a', 34a and 34a' of the receptacle 10 are superimposed upon and supported by projecting portions 24b, 24b', 34b and 34b' respectively of the receptacle 10' into which the receptacle 10 is placed.

In the stacking arrangement shown in FIGURES 2, 3A, 3B and 3C, the protrusions 28, 28', 38 and 38' on the lower receptacle 10' extend through and are retained within the perforations 26b, 26b', 36b and 36b' respectively on the upper receptacle 10. Thus when the receptacles 10 and 10' are nested and interconnected as shown in FIGURES 2, 3A, 3B and 3C the receptacles are firmly interlocked in a vertically stacked relationship with minimum vertical displacement between the receptacles.

When it is desired to remove the receptacles 10 and 10' from the stacked arrangement shown in FIGURES 2, 3A, 3B and 3C the upper surfaces 46 and 46' of the receptacle 10 may be gripped by hand and the receptacle 10 lifted sufficiently high so that the protrusions 28, 28', 38 and 38' on the receptacle 10' are no longer retained within perforations 26b, 26b', 36b and 36b' respectively of the receptacle 10. By means of a forward sliding motion the protruding portions 76, 76', 78 and 78' of the receptacle 10 are slid into a superimposed position upon shoulders 30, 30', 42 and 42' respectively, of the receptacle 10'. Thus the interconnecting structures for the receptacles 10 and 10' are thereby disengaged and the receptacle 10 may thereafter be lifted clear of the receptacle 10'.

In order to obtain the stacking arrangement shown in FIGURES 4, 5A and 5B a receptacle 10 is placed within a receptacle 10' so that the bottom surfaces of protruding portions 76, 76', 78 and 78' are superimposed upon and supported by projecting portions 24b, 24b', 34b and 34b' respectively of the receptacle 10'. In the stacking arrangement shown in FIGURES 4, 5A and 5B the protrusions 28, 28', 38 and 38' on the lower receptacle 10' extend through and are retained within the perforations 26a, 26a', 36a, 36a' respectively on the upper receptacle 10. Thus when the receptacles 10 and 10' are stacked and interconnected as shown in FIGURES 4, 5A and 5B the receptacles are firmly interlocked in a vertically stacked relationship with medium vertical displacement between the receptacles.

When it is desired to remove the receptacles 10 and 10' from the vertically stacked relationship shown in FIGURES 4, 5A and 5B the upper surfaces 46 and 46' of the receptacle 10 may be gripped by hand and the receptacle 10 lifted sufficiently high so that the protrusions 28, 28', 38 and 38' on the receptacle 10' are no longer retained within perforations 26a, 26a', 36a and 36a' respectively of the receptacle 10. By means of a forward sliding motion the interconnecting structures for the receptacles 10 and 10' may thereby be disengaged and the receptacle 10 may thereafter be lifted clear of the receptacle 10'.

In order to obtain the stacking arrangement shown in FIGURES 6, 7A and 7B a receptacle 10 is placed upon a receptacle 10' so that the perforations 32, 32', 40 and 40' provided withihn the bottom side of protruding portions 76, 76', 78 and 78' are superimposed upon and thus receive protrusions 28, 28', 38 and 38' respectively on the receptacle 10'. The notched recesses 70, 70', 72 and 72' of the perforations 32, 32', 40 and 40' respectively on the receptacle 10 fit firmly over the ribbed portions 66, 66', 68 and 68' respectively on the receptacle 10 and securely hold the receptacles 10 and 10' in an interlocked vertically stacked relationship with greater spacial displacement between adjacent disposed vertically stacked receptacles than is shown in either FIGURES 2 or 4.

When it is desired to remove the receptacles 10 and 10' from the vertically stacked relationship shown in FIGURES 6, 7A and 7B, the upper surfaces 46 and 46' of the receptacle 10 may be gripped by hand and the receptacle 10 lifted sufficiently high so that the protrusions 28, 28', 38 and 38' on the receptacle 10' are no longer retained within the perforations 32, 32', 40 and 40' respectively of the receptacle 10.

In order to facilitate the stacking as shown in FIGURE 6, it is desirable to align ribs 56, 57 and 60 with notches 54 and 58. With container 10 displaced horizontally back a slight amount, it is desirable to slide the container into the stacked position shown in FIGURE 6. Ribs 56, 57 and 60 act as guides until cut out 40 drops into protrusion 38. When this has been accomplished then cut out 32 will drop onto protrusion 28.

In order to obtain the stacking arrangement shown in FIGURES 8, 9A and 9B, a receptacle 10 is placed upon a receptacle 10' so that the perforations 32 and 32' provided within the bottom side of protruding portions 76 and 76' respectively are superimposed upon and thus receive protrusions 48 and 48' respectively provided on the upper surfaces 46 and 46' respectively on the receptacle 10'. Also ribbed members 56 and 56' fit within notched portions 54 and 54' respectively provided on the upper surface 50 of the receptacle 10'. Similarly parallel ribbed members 57, 60 and 57', 60' fit within notched portions 58 and 58' respectively provided on the upper surface 50 of the receptacle 10'.

With the receptacles thus positioned and interconnected so as to be held firmly in place the receptacles may be carried at an angle to the horizontal plane by means of a display apparatus including a dolly 80 and a support structure 82, for example, as shown in FIGURE 8. Preferably the display apparatus will be of the type disclosed in my copending application Ser. No. 548,693 filed May 9, 1966 entitled Display Apparatus.

When loaves of bread, for example, are retained within the receptacles stacked as shown in FIGURES 8, 9A and 9B the loaves so retained are continuously displayed at the forward exposed portion of the receptacle, and the loaves so displayed are continuously displayed as long as the loaves remain within the receptacle, such continuous display of the loaves being provided for without the aid of tools, machines, or hands, but instead such continuous display of the loaves being caused by normal gravitational force.

It is understood that the receptacle of this invention may be nested and stacked with a multiplicity of like receptacles, so that provision is made for varying spatial clearances between adjacently disposed vertically stacked receptacles, and that while a particular embodiment of this invention has been illustrated and described, it is apparent that modifications may be made without departing from the scope of the invention. The following claims are intened to cover all such modifications which come within the spirit and scope of the invention.

What is claimed is:

1. A receptacle adapted for stacking with a receptacle of identical configuration or variably nested therewith, said receptacle comprising: a bottom, said bottom including means for retaining said receptacle in a stacked relationship with a receptacle of identical configuration; a pair of opposed side walls, said side walls including: means for supporting a receptacle of identical configuration nested within said receptacle, said supporting means providing for a plurality of dimensional clearances between said receptacle and a receptacle of identical configuration nested within said receptacle, means for retaining a receptacle of identical configuration nested within said receptacle, means for retaining said receptacle in a nested relationship within a receptacle of identical configuration, means for overlapping support structure within a receptacle of identical configuration when said receptacle is nested within such a receptacle of identical configuration, means for retaining a receptacle of identical configuration in a stacked off-set relationship with said receptacle whereby the forward portion of said receptacle is fully exposed with no overlapping structure being superimposed over the forward portion of said receptacle, said side walls being joined at their lower edges to said bottom, and a rear end wall, said rear wall joining said opposed side walls and said bottom for thereby forming in combination with said bottom and said side walls said receptacle, said rear end wall including means for retaining said receptacle in a stacked relationship with a receptacle of identical configuration.

2. A receptacle in accordance with claim 1 wherein said means provided on the bottom of said receptacle for retaining said receptacle in a stacked relationship with a receptacle of identical configuration includes a plurality of ribbed members, said ribbed members being provided with a configuration for being received within and retained by corresponding structure provided on the rear end wall of a receptacle of identical configuration.

3. A receptacle in accordance with claim 1 wherein said supporting means provided on said side walls includes a plurality of projecting portions, said projecting portions projecting from said side walls into the interior of said receptacle whereby said projecting portions provide for a plurality of varying dimensional clearances between said receptacle and a receptacle of identical configuration nested within said receptacle.

4. A receptacle in accordance with claim 3 wherein said supporting means provided on said side walls includes a plurality of shoulder members, said shoulder members providing support structure for the movement of a receptacle of identical configuration to be nested within said receptacle on to or away from said projecting portions provided on said side walls of said receptacle.

5. A receptacle in accordance with claim 1 wherein said mean for retaining a receptacle of identical configuration nested within said receptacle includes one or more protrusions, said protrusions being provided on the means for supporting a receptacle of identical configuration, said protrusions having a configuration so as to be received within and retained by complementary structure of a receptacle of identical configuration.

6. A receptacle in accordance with claim 1 wherein said means for supporting a receptacle of identical configuration is provided with one or more perforations for receiving and retaining complementary structure of a receptacle of identical configuration whereby said receptacle is retained in a stacked relationship with a receptacle of identical configuration.

7. A receptacle in accordance with claim 1 wherein said means for overlapping support structure within a receptacle of identical configuration includes the hollow interior portions of projecting portions which project from said side walls into the interior of said receptacle.

8. A receptacle in accordance with claim 1 wherein said means for retaining a receptacle of identical configuration in a stacked off-set relationship with said receptacle includes one or more protrusions provided on the upper surfaces of said receptacle, said protrusions having a configuration for being received within and retained by complementary structure of a receptacle of identical configuration so that when said protrusions are so retained within complementary structure of a receptacle of identical configuration the forward portion of said receptacle is fully exposed with no overlapping structure being superimposed over the forward portion of said receptacle.

9. A receptacle in accordance with claim 1 wherein said means provided on the rear end wall of said receptacle for retaining said receptacle in a stacked relationship with a receptacle of identical configuration includes a plurality of notched portions, said notched portions being provided with a configuration for receiving and retaining corresponding structure provided on the bottom of a receptacle of identical configuration.

References Cited

UNITED STATES PATENTS

| 2,655,283 | 10/1953 | Moldt. | |
| 3,022,900 | 2/1962 | Averill. | |
| 3,141,554 | 7/1964 | Sussman et al. | 211—126 |
| 3,219,232 | 11/1965 | Wilson | 211—126 XR |

ROY D. FRAZIER, *Primary Examiner.*

WILLIAM D. LOULAN, *Assistant Examiner.*